US010743295B2

(12) United States Patent
Pang et al.

(10) Patent No.: US 10,743,295 B2
(45) Date of Patent: Aug. 11, 2020

(54) MESSAGE SENDING METHOD, RELATED DEVICE, AND SYSTEM

(71) Applicant: HUAWEI TECHNOLOGIES CO., LTD., Shenzhen, Guangdong (CN)

(72) Inventors: Gaokun Pang, Shenzhen (CN); Ping Fang, Shenzhen (CN); Zhiming Ding, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/327,953

(22) PCT Filed: Aug. 25, 2016

(86) PCT No.: PCT/CN2016/096685
§ 371 (c)(1),
(2) Date: Feb. 25, 2019

(87) PCT Pub. No.: WO2018/035801
PCT Pub. Date: Mar. 1, 2018

(65) Prior Publication Data
US 2019/0208514 A1    Jul. 4, 2019

(51) Int. Cl.
*H04W 72/04*    (2009.01)
*H04L 5/00*    (2006.01)
*H04W 84/12*    (2009.01)

(52) U.S. Cl.
CPC ........... *H04W 72/0406* (2013.01); *H04L 5/00* (2013.01); *H04W 72/044* (2013.01); *H04W 84/12* (2013.01)

(58) Field of Classification Search
None
See application file for complete search history.

(56) References Cited

U.S. PATENT DOCUMENTS

| 9,408,214 B2 * | 8/2016 | Merlin ...................... H04J 1/14 |
| 2013/0148615 A1 * | 6/2013 | Li .......................... H04W 28/26 |
| | | 370/329 |

(Continued)

FOREIGN PATENT DOCUMENTS

| CN | 102595517 A | 7/2012 |
| CN | 103404202 A | 11/2013 |
| CN | 105281864 A | 1/2016 |

OTHER PUBLICATIONS

PCT International Search Report and Written Opinion issued in International Application No. PCT/CN2016/096685 dated Apr. 27, 2017, 16 pages (with English translation).

*Primary Examiner* — Shripal K Khajuria
(74) *Attorney, Agent, or Firm* — Fish & Richardson P.C.

(57) ABSTRACT

A method implemented by a first device includes: sending a first message to a second device on a first bandwidth; receiving on the first bandwidth, a second message sent by the second device in response to the first message; sending a third message on a second bandwidth, where the first message, the second message, and the third message all carry device-reserved time-frequency resource information; and within the device-reserved time-frequency resource information, sending, a message to the second device on the first bandwidth; or receiving on the first bandwidth, a message sent by the second device, where if the first bandwidth is less than 20 M, the second bandwidth is greater than or equal to 20 M; or if the first bandwidth is greater than or equal to 20 M, the second bandwidth is less than 20 M. Embodiments of the present disclosure further provide a related device and a system.

20 Claims, 6 Drawing Sheets

(56) References Cited

U.S. PATENT DOCUMENTS

| | | | | |
|---|---|---|---|---|
| 2013/0272288 A1* | 10/2013 | Li | ............... | H04L 5/0053 |
| | | | | 370/338 |
| 2014/0114753 A1* | 4/2014 | Xiao | ............... | G06Q 30/02 |
| | | | | 705/14.49 |
| 2015/0296057 A1* | 10/2015 | Ohana | ............... | H04L 69/324 |
| | | | | 370/437 |

* cited by examiner

MESSAGE SENDING METHOD, RELATED DEVICE, AND SYSTEM

CROSS-REFERENCE TO RELATED APPLICATIONS

This application is a national stage of International Application No. PCT/CN2016/096685, filed on Aug. 25, 2016, which is hereby incorporated by reference in its entirety.

TECHNICAL FIELD

The present invention relates to the field of communications technologies, and in particular, to a message sending method, a related device, and a system.

BACKGROUND

A Wi-Fi technology is a short-range wireless communications technology. A common structure of the Wi-Fi technology includes an access point (Access Point, AP) and a plurality of stations (Station, STA). The AP periodically sends a beacon (beacon) frame to announce existence of a network to the outside world. The STA proactively sends a probe request (probe request) and receives a probe response (probe response), or passively receives a beacon, to know existence of the AP, and then exchanges a message with the AP to join the network of the AP. The network formed by the AP and the STAs is referred to as a basic service set (basic service set, BSS). The BSS includes an AP device and a STA device that establishes a connection to the AP.

When a distance between a transmit end device (such as the AP) and a receive end device (such as the STA) is relatively long (exceeding a communication transmission range that can be reached by a legacy message), the transmit end device and the receive end device need to perform long-range (long range, LR) communication. To enable a device to perform LR transmission, a bandwidth used when the device sends a message usually needs to be reduced. In other words, narrowband transmission is used. In an LR transmission mode, a series of narrowband messages need to be exchanged between narrowband devices that perform LR transmission. However, the LR transmission uses a mainstream frequency band such as a 2.4 G frequency band, message transmission of other devices (such as legacy devices, where existing 802.11b, a, g, n, ac devices basically use a bandwidth being a multiple of 20 M (such as 20 M, 40 M, 80 M, or 160 M) as a unit, and these devices send a message on a 20 M bandwidth, and the device that sends the message on the 20 M bandwidth may be referred to as legacy devices) on the frequency band causes interference to the narrowband devices. In addition, when the legacy devices perform broadband transmission, because the legacy devices also use the mainstream frequency band (which is the same as the frequency band used by the narrowband device), a broadband device receives interference from message transmission of the narrowband device.

Therefore, how to maintain stability of LR transmission performed by the narrowband device and how to maintain stability of broadband transmission performed by the broadband device are technical problems to be urgently resolved in the art.

SUMMARY

Embodiments of the present invention provide a message sending method and a related device, so as to maintain stability of LR transmission performed by a narrowband device and stability of broadband transmission performed by a broadband device.

According to a first aspect, an embodiment of the present invention provides a message sending method, including: sending, by a first device, a first message to a second device on a first bandwidth, where the first message carries first time-frequency resource information reserved by the first device; receiving, by the first device on the first bandwidth, a second message sent by the second device in response to the first message, where the second message carries second time-frequency resource information reserved by the second device; sending, by the first device, a third message on a second bandwidth, where the third message carries third time-frequency resource information reserved by the first device, and the third time-frequency resource information is determined based on the first time-frequency resource information and/or the second time-frequency resource information; and based on the third time-frequency resource information, sending, by the first device, a message to the second device on the first bandwidth; or receiving, by the first device on the first bandwidth, a message sent by the second device, where when the first bandwidth is less than 20 M, the second bandwidth is greater than or equal to 20 M; or when the first bandwidth is greater than or equal to 20 M, the second bandwidth is less than 20 M. It can be learned that, because the first message, the second message, and the third message all carry time-frequency resource information reserved by a respective device, when devices around the first device and the second device receive these messages, the devices may set a respective current medium busy time value NAV of the devices based on the time-frequency resource information carried in these messages, so that these devices do not preempt the medium. Therefore, stability of LR transmission performed by a narrowband device and stability of broadband transmission performed by a broadband device can be maintained.

In some feasible implementations, a specific implementation of the sending, by the first device, a third message on a second bandwidth is: sending, by the first device, the third message on at least two different second bandwidths.

In some feasible implementations, the time-frequency resource information is carried in a duration field or a physical header. An existing message frame format is used and can be compatible with a legacy device, so that the legacy device does not interfere with subsequent transmission.

In some feasible implementations, before the sending, by a first device, a first message to a second device on a first bandwidth, the method further includes: sending, by the first device, a fourth message on the second bandwidth, where the fourth message carries a channel occupancy period, and an expiration point of the channel occupancy period is any time point after a time point at which the first device receives the second message. The first device sends the fourth message, and a channel is occupied, so that the second message can be received successfully, to further protect transmission of a device from interference.

In some feasible implementations, the time-frequency resource information includes medium reservation time information and/or reserved channel information.

In some feasible implementations, when the first bandwidth is greater than or equal to 20 M, the second bandwidth is less than 20 M, and a specific implementation of the sending, by the first device, a third message on a second bandwidth is: when a distance between the first device and the second device is greater than or equal to a preset threshold, sending, by the first device, the third message on the second bandwidth. On one hand, broadband data transmission can be protected from interference from narrowband transmission, and on the other hand, narrowband data transmission is protected from interference from broadband transmission.

According to a second aspect, an embodiment of the present invention provides a message sending method, including: receiving, by a second device on a first bandwidth, a first message sent by a first device, where the first message carries first time-frequency resource information reserved by the first device; sending, by the second device, a second message to the first device on the first bandwidth in response to the first message, where the second message carries second time-frequency resource information reserved by the second device, and the second time-frequency resource information is determined based on the first time-frequency resource information; sending, by the second device, a third message on a second bandwidth, where the third message carries third time-frequency resource information reserved by the second device, and the third time-frequency resource information is determined based on the first time-frequency resource information and/or the second time-frequency resource information; and based on the third time-frequency resource information, receiving, by the second device on the first bandwidth, a message sent by the first device; or sending, by the second device, a message to the first device on the first bandwidth, where when the first bandwidth is less than 20 M, the second bandwidth is greater than or equal to 20 M; or when the first bandwidth is greater than or equal to 20 M, the second bandwidth is less than 20 M. It can be learned that, because the first message, the second message, and the third message all carry time-frequency resource information reserved by a respective device, when devices around the first device and the second device receive these messages, the devices may set a respective current medium busy time value NAV of the devices based on the time-frequency resource information carried in these messages, so that these devices do not preempt the medium. Therefore, stability of LR transmission performed by a narrowband device and stability of broadband transmission performed by a broadband device can be maintained.

In some feasible implementations, a specific implementation of the sending, by the second device, a third message on a second bandwidth is: sending, by the second device, the third message on at least two different second bandwidths.

In some feasible implementations, the time-frequency resource information is carried in a duration field or a physical header.

In some feasible implementations, the time-frequency resource information includes medium reservation time information and/or reserved channel information.

According to a third aspect, the present invention provides a device, including modules configured to perform the method in the first aspect.

According to a fourth aspect, the present invention provides a device, including modules configured to perform the method in the second aspect.

According to a fifth aspect, the present invention provides a device. The device includes a processor, and the processor is configured to support the device in performing a corresponding function in the message sending method provided in the first aspect. The device may further include a memory, the memory is configured to be coupled to the processor, and the memory stores a program instruction and data that are necessary for the device. The device may further include a communications interface, configured to perform communication between the device and another device or a communications network.

According to a sixth aspect, the present invention provides a device. The device includes a processor, and the processor is configured to support the device in performing a corresponding function in the message sending method provided in the second aspect. The device may further include a memory, the memory is configured to be coupled to the processor, and the memory stores a program instruction and data that are necessary for the device. The device may further include a communications interface, configured to perform communication between the device and another device or a communications network.

According to a seventh aspect, the present invention provides a computer storage medium, configured to store a computer software instruction used by the network element provided in the fifth aspect. The computer software instruction includes a program designed for implementing the foregoing aspect.

According to an eighth aspect, the present invention provides a computer storage medium, configured to store a computer software instruction used by the network element provided in the sixth aspect. The computer software instruction includes a program designed for implementing the foregoing aspect.

Compared with the prior art, the solutions provided in the present invention can maintain stability of LR transmission performed by a narrowband device and stability of broadband transmission performed by a broadband device.

These or other aspects of the present invention are more concise and comprehensible in descriptions of the following embodiments.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make a person skilled in the art understand the technical solutions in the present invention better, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Details are separately described in the following.

In the specification, claims, and accompanying drawings of the present invention, the terms "first", "second", "third", "fourth", and so on are intended to distinguish between different objects but do not indicate a particular order. In addition, the terms "include", "contain", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of the present invention. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

The following describes some terms in this application, so as to help a person skilled in the art have a better understanding.

(1) A narrowband is a bandwidth less than 20 M, and usually refers to a width of a channel used by a device to send a message. The narrowband may mean that a bandwidth of a channel used by a device to send a message is less than 20 M, such as 10 M, 5 M, 4 M, or 2 M. This is not limited in the present invention. The narrowband in the present invention may be a first bandwidth or a second bandwidth.

(2) A broadband is a bandwidth greater than or equal to 20 M, and usually refers to a width of a channel by a device to send a message. The broadband may mean that a bandwidth of a channel used by a device to send a message is greater than or equal to 20 M, such as 20 M, 40 M, 80 M, or 160 M. This is not limited in the present invention. The broadband in the present invention may be a first bandwidth or a second bandwidth.

(3) A broadband message is defined relative to a narrowband message. To be specific, a width of a channel on which a first message is transmitted is greater than a width of a channel on which a second message is transmitted. The first message becomes a broadband message, and the second message becomes a narrowband message. The broadband message is a message in a unit of 20 M, and may be a message of 20 M, a message of 40 M, or a message of 80 M. In other words, these messages are sent on 20 M, 40 M, or 80 M.

(4) A narrowband message is a message whose bandwidth is less than 20 M. In other words, the message is sent on a bandwidth less than 20 M.

(5) A first device, a second device, a third device, a fourth device, a fifth device, and a sixth device may be an access point (access point, AP), a station (Station, STA), peer to peer (peer to peer, P2P), a group owner (group owner, GO), a client device (client), a neighbor awareness network device (neighbor awareness network, NAN), and the like. Specifically, the first device is used as a transmit end, the second device is used as a receive end, and a transmit end device or a receive end device may be an AP, a STA, a P2P device, a group owner device, a client device, a NAN device, or the like. A specific type of the device may be listed as follows:

The transmit end is an AP, and the receive end is a STA.
The transmit end is a STA, and the receive end is an AP.
The transmit end is a GO, and the receive end is a client.
The transmit end is a client, and the receive end is a GO.
The transmit end is a P2P device, and the receive end is a P2P device.
The transmit end is a NAN device, and the receive end is a NAN device.

The device may be specifically a device with a Wi-Fi communications module, such as a router, a mobile phone, a computer, a television, or a tablet computer.

(6) A broadband device in the specification is a legacy device. A sent broadband message is transmitted on a channel of 20 M.

(7) A narrowband device is a device capable of sending a narrowband message. In other words, the message is sent on a channel less than 20 M.

(8) A current medium busy time value is a network allocation vector (Network Allocation Vector, NAV). (The NAV is a timer, configured to record a channel occupancy time in a unit of microsecond. Within the occupancy time, a device does not contend for the channel. The device gradually counts down a recorded NAV value to zero. Provided that the NAV value is non-zero, it indicates that a medium is in a busy state, and the device does not preempt a channel resource to send data. When the NAV is zero, the device considers that the channel is in an idle state, and preempts the channel to send data).

(9) "Plurality" refers to at least two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The following describes the embodiments of this application with reference to accompanying drawings.

Figure 1:
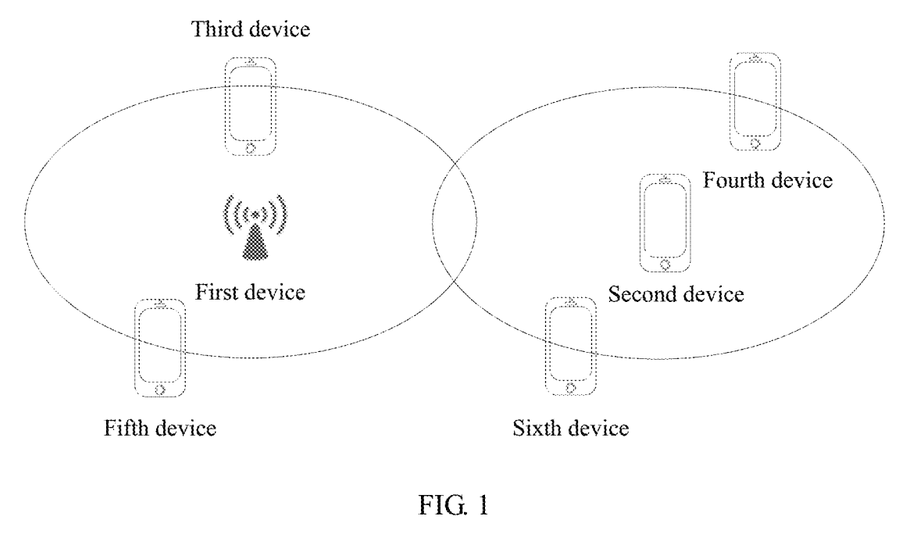
FIG. 1 is a schematic diagram of a communications system according to an embodiment of the present invention.

Referring to FIG. 1, FIG. 1 is a schematic diagram of a communications system disclosed in an embodiment of the present invention. The communications system shown in FIG. 1 includes a first device 110, a second device 120, a third device 130, a fourth device 140, a fifth device 150, and a sixth device 160. The first device 110 sends a first message to the second device on a first bandwidth, where the first message carries first time-frequency resource information reserved by the first device, so that the third device 130 around the first device 110 sets a current medium busy time value, an NAV value, of the third device 130 after receiving the first message, so that the third device 130 does not to preempt the medium. The second device 120 sends a second message on the first bandwidth after receiving the first message, where the second message carries second time-frequency resource information reserved by the second device, and the second time-frequency resource information is determined based on the first time-frequency resource information, so that the fourth device 140 around the second device 120 sets a current medium busy time value, an NAV value, of the fourth device 140 after receiving the second message, so that the fourth device does not to preempt the medium. The first device 110 sends a third message on a second bandwidth, where the third message carries third time-frequency resource information reserved by the first device, and the third time-frequency resource information is determined based on the first time-frequency resource information and/or the second time-frequency resource information, so that the fifth device 150 around the first device 110 sets a current medium busy time value, an NAV value, of the fifth device 150 after receiving the third message, so that the fifth device does not to preempt the medium. The second device 120 sends the third message on the second bandwidth when the first device 110 sends the third message, where the third message carries the third time-frequency resource information reserved by the second device, so that the sixth device 160 around the second device 120 sets a current medium busy time value, an NAV value, of the sixth device 160 after receiving the third message, so that the sixth device does not to preempt the medium. Based on the third time-frequency resource information, the first device 110 receives, on the first bandwidth, a message sent by the first device, or sends a message to the first device on the first bandwidth. Based on the third time-frequency resource information, the first device 110 receives, on the first bandwidth, a message sent by the second device, or sends a message to the second device on the first bandwidth; and based on the third time-frequency resource information, the second device 120 receives, on the first bandwidth, a message sent by the first device, or sends a message to the first device on the first bandwidth, which may be specifically: Within the third time-frequency resource (for example, the third time-frequency resource is a medium reservation time, that is, within the reservation time), the second device receives, on the first bandwidth, a message sent by the first device, or sends a message to the first device on the first bandwidth; and/or within the third time-frequency resource (for example, the third time-frequency resource is a medium reservation time, that is, within the reservation time), the first device receives, on the first bandwidth, a message sent by the second device, or sends a message to the second device on the first bandwidth. When the first bandwidth is less than 20 M, the second bandwidth is greater than or equal to 20 M; or when the first bandwidth is greater than or equal to 20 M, the second bandwidth is less than 20 M. The third device is capable of receiving a message on the first bandwidth, and the fourth device is capable of receiving a message on the second bandwidth. Therefore, stability of LR transmission performed by a narrowband device and stability of broadband transmission performed by a broadband device is maintained.

Optionally, in an implementation, the third message sent by the first device 110 on the second bandwidth and the third message sent by the second device 120 on the second bandwidth carry a same receive end address.

Optionally, in an implementation, that the first device 110 and the second device 120 send the third message on the second bandwidth is specifically: The first device 110 and the second device 120 send the third message on at least two different second bandwidths.

Optionally, in an implementation, the time-frequency resource information is carried in a duration (duration) field or a physical header.

Optionally, in an implementation, before the first device 110 sends the first message to the second device 120 on the first bandwidth, the first device 110 sends a fourth message on the second bandwidth. The fourth message carries a channel occupancy period, and an expiration point of the channel occupancy period is any time point after a time point at which the first device receives the second message. For example, the expiration point of the channel occupancy period is a time point at which receiving the second message by the first device is completed (that is, a period of time from the channel occupancy period to the time point at which receiving the second message by the first device is completed, which may be specifically a time period from a current time at which the fourth message is sent to the time point at which receiving the second message is completed). Alternatively, the expiration point of the channel occupancy period is a time point at which the first device starts to receive the second message (that is, a period of time from the channel occupancy period to the time point at which the first device starts to receive the second message, which may be specifically a time period from a current time at which the fourth message is sent to the time point at which the second message starts to be received).

Optionally, in an implementation, the time-frequency resource information includes medium reservation time information and/or reserved channel information.

Optionally, in an implementation, when the first bandwidth is greater than or equal to 20 M, the second bandwidth is less than 20 M, and that the first device 110 sends the third message on the second bandwidth is specifically: When a distance between the first device 110 and the second device 120 is greater than or equal to a preset threshold, the first device sends the third message on the second bandwidth.

For ease of understanding by a person skilled in the art, the following describes the embodiments of the present invention in detail with reference to the accompanying drawings.

Figure 2:
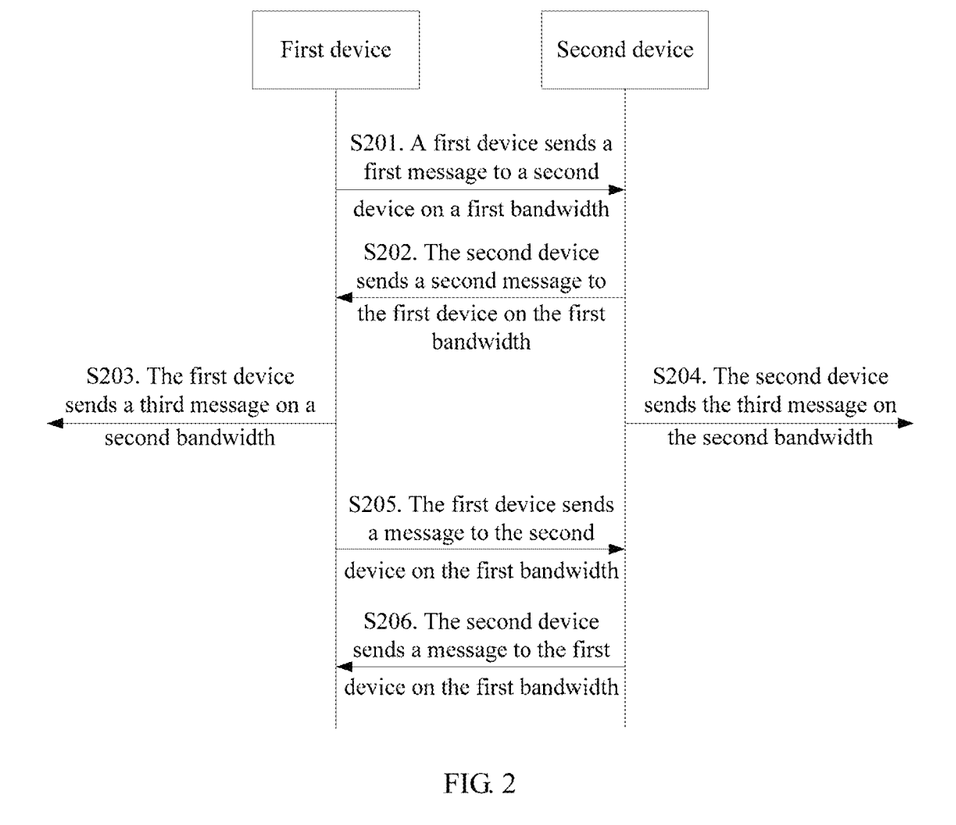
FIG. 2 is a schematic flowchart of a message sending method according to Embodiment 1 of the present invention.

S201. A first device sends a first message to a second device on a first bandwidth, where the first message carries first time-frequency resource information reserved by the first device.

S202. The second device receives, on the first bandwidth, the first message sent by the first device, and the second device sends a second message to the first device on the first bandwidth in response to the first message, where the second message carries second time-frequency resource information reserved by the second device, and the second time-frequency resource information is determined based on the first time-frequency resource information.

S203. The first device sends a third message on a second bandwidth, where the third message carries third time-frequency resource information reserved by the first device, and the third time-frequency resource information is determined based on the first time-frequency resource information and/or the second time-frequency resource information.

S204. When the first device sends the third message on the second bandwidth, the second device sends the third message on the second bandwidth, where the third message carries the third time-frequency resource information reserved by the second device.

S205. Based on the third time-frequency resource information, the first device sends a message to the second device on the first bandwidth; and the second device receives, on the first bandwidth, the message sent by the first device.

Alternatively, the first device receives, on the first bandwidth, a message sent by the second device.

S206. Based on the third time-frequency resource information, the second device sends a message to the first device on the first bandwidth; and the first device receives, on the first bandwidth, the message sent by the second device, where when the first bandwidth is less than 20 M, the second bandwidth is greater than or equal to 20 M; or when the first bandwidth is greater than or equal to 20 M, the second bandwidth is less than 20 M.

Optionally, the first message may be a request to send (Request to Send, RTS) message or a trigger message, for example, an RTS message sent by using the first bandwidth or another message sent by using the first bandwidth.

Optionally, the time-frequency resource information includes medium reservation time information and/or reserved channel information.

Optionally, the time-frequency resource information is carried in a duration field or a physical header. For example, the medium reservation time information is carried in a duration field of a MAC header, a transmission opportunity (transmission opportunity, TXOP) field of the physical header, or a SIG length field of the physical header. The length field indicates a length, and corresponding length information needs to be calculated based on a data rate and a time and is then added to the length field.

Optionally, the first message may be sent on a pre-agreed first bandwidth or on a fixed first bandwidth used for management.

Optionally, the first message may use an existing RTS message format or action message format, an existing management frame format or control frame format, a newly defined message format, or the like. This is not limited in the present invention.

Figure 3:
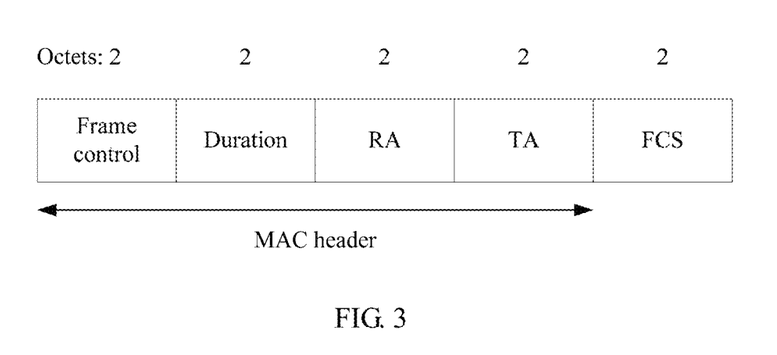
FIG. 3 is a schematic diagram of a message format according to Embodiment 1 of the present invention.

For example, when the first message is in an RTS message format, the medium reservation time information is carried in a duration field of a MAC header of RTS. As shown in FIG. 3, a duration field represents time information of a medium reserved by the first device; a frame control field represents a frame header control portion; an RA field represents a receive address receive address; a TA field represents a transmit address transmit address; and a frame check sequence (frame check sequence, FCS) field is used to identify frame integrity, where whether a received frame is complete may be learned through FCS check.

Figure 4:
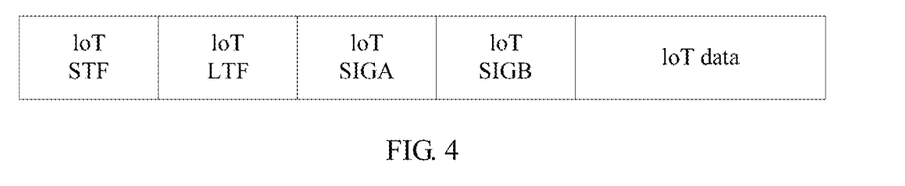
FIG. 4 is a schematic diagram of a message format according to Embodiment 2 of the present invention.

For another example, when the first message is in a newly defined IoT transmission frame format, the medium reservation time information is carried in a SIGA field of an IoT message. As shown in FIG. 4, a short training field (Short Training field, STF) is mainly used for automatic gain control (automatic gain control, AGC) adjustment, diversity selection, timing synchronization, coarse frequency synchronization of a receive end; a long training field (Long Training field, LTF) is used for channel estimation and fine frequency synchronization of a receive end; and a signal (signal, SIG) field is used to indicate some information, which includes length information used to indicate a message length.

Optionally, the second message may be a clear to send (clear to send, CTS) message, for example, a CTS message sent by using the first bandwidth or another message sent by using the first bandwidth.

Optionally, the second time-frequency resource information is determined based on the first time-frequency resource information. Specifically, in an example in which the first message is an RTS message, and the second message is CTS, medium reservation time information included in the second time-frequency resource information=Medium reservation time carried in the first message−SIFS time−Time for sending the second message. Short interframe space (Short interframe space, SIFS) has different duration in different standards and is defined according to a standard. For example, the SIFS is 10 μs in 11 b, 16 μs in 11 a, 10 μs in 11 g, 10 μs or 16 μs in 11 n, and 16 μs in 11 ac. During narrowband transmission, the SIFS time uses duration specified in a standard. In addition, if another narrowband message is sent, a time used for sending the another narrowband message is correspondingly subtracted.

Optionally, the second message may use an existing CTS message format or action message format, an existing management frame format or control frame format, a newly defined message format, or the like. This is not limited in the present invention.

Figure 5:
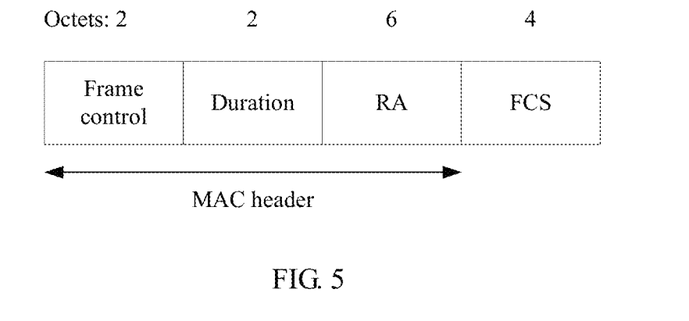
FIG. 5 is a schematic diagram of a message format according to Embodiment 3 of the present invention.

For example, when the second message is in a CTS message format, the medium reservation time information is carried in a duration field of a MAC header of CTS. As shown in FIG. 5, a duration field represents time information of a medium reserved by the second device, where the medium is considered to be idle within the time; a frame control field represents a frame header control portion; an RA field represents a receive address receive address; and a frame check sequence (frame check sequence, FCS) field is used to identify frame integrity, where whether a received frame is complete may be learned through FCS check.

In addition, it is assumed that the second message is in a newly defined IoT transmission frame format, similar to the first message that is in a newly defined IoT transmission frame format. Refer to that shown in FIG. 4, and details are not described herein again.

Optionally, the second time-frequency resource information is determined based on the first time-frequency resource information and the second time-frequency resource information. Specifically, in an example in which the first message is an RTS message and the second message is CTS, medium reservation time information included in the third time-frequency resource information=Medium reservation time information included in the second time-frequency resource information−SIFS time (which may be different from the SIFS time used by the first message)−Time for sending the third message; or medium reservation time information included in the third time-frequency resource information=Medium reservation time carried in the first message−SIFS time (the SIFS time used by the first message)−Time for sending the second message−SIFS time (which may be different from the SIFS time used by the first message)−Time for sending the third message.

Optionally, the third message may be a CTS message, for example, a CTS message sent by using the second bandwidth or another message sent by using the first bandwidth.

Optionally, the third message may be sent directionally. For example, the first device sends the third message to the second device, or the second device sends the third message to the first device.

Further, it may be specified that the third message is sent after an SIFS time elapses since the second message is sent. Alternatively, a device-agreed time for sending the third message is further included in the first message or the second message. Time information of sending the third message may be an agreed time point for sending the third message or an agreed period of time after which the third message is to be sent.

In addition, after sending the third message, the first device and the second device may not need to add a broadband physical header to a message to be sent on the first bandwidth within a third time-frequency resource, to perform communication.

Optionally, the third message sent by the first device on the second bandwidth and the third message sent by the second device on the second broadband have at least a same scrambling code, a same address such as a same receive end address, and the like.

Further, the first message or the second message that is previously exchanged needs to carry same information (including at least one of a same receive end address, a same scrambling code, and the like) used for sending a broadband message.

Optionally, the third message may use an existing CTS message format or action message format, an existing management frame format or control frame format, a newly defined message format, or the like. This is not limited in the present invention.

Optionally, the third message sent by the first device on the second bandwidth and the third message sent by the second device on the second bandwidth carry a same receive end address.

For example, it is assumed that the third message is in a CTS message format, similar to the second message that is in a CTS message format. Refer to that shown FIG. 5, and details are not described herein again.

In addition, if another message format is used, when the first device sends a message to the second device, the message needs to carry downlink indication information. The indication information is sent by the first device to the second device. When the second device sends a message to the first device, the message needs to carry uplink indication information. The indication information is sent by the second device to the first device.

Optionally, the first device may also learn that other devices between the first device and the second device also send the third message.

Further, the first device needs to find out and obtain the other devices between the first device and the second device in advance. The other devices are relay devices (relay device), and the like.

It can be learned that when the first bandwidth is less than 20 M (namely, a narrowband) and the second bandwidth is greater than or equal to 20 M (namely, a broadband), the first device sends the first message to the second device on the narrowband, so that a third device around the first device sets, based on the first time-frequency resource information carried in the first message, a current medium busy time value of the third device after receiving the first message, where a medium is considered to be busy (busy) within the time; the second device sends the second message to the first device on the narrowband in response to the first message, so that a fourth device around the second device sets, based on the second time-frequency resource information carried in the second message, a current medium busy time value of the fourth device after receiving the second message, where a medium is considered to be busy (busy) within the time; the first device and the second device simultaneously send the third message on the broadband, so that a fifth device around the first device and a sixth device around the second device set, based on the third time-frequency resource information carried in the third message, current medium busy time values of the fifth device and the sixth device respectively after receiving the second message, where a medium is considered to be busy (busy) within the time, so that the devices around the first device and the second device do not preempt a communication channel between the first device and the second device, thereby maintaining stability of LR transmission performed by a narrowband device. In addition, the third device and the fourth device are capable of receiving a message on the narrowband, and the fifth device and the sixth device are capable of receiving a message on the broadband.

In addition, when the first bandwidth is greater than or equal to 20 M (namely, a broadband) and the second bandwidth is less than 20 M (namely, a narrowband), the first device sends the first message to the second device on the broadband, so that a third device around the first device sets, based on the first time-frequency resource information carried in the first message, a current medium busy time value of the third device after receiving the first message, where a medium is considered to be busy (busy) within the time; the second device sends the second message to the first device on the broadband in response to the first message, so that a fourth device around the second device sets, based on the second time-frequency resource information carried in the second message, a current medium busy time value of the fourth device after receiving the second message, where a medium is considered to be busy (busy) within the time; the first device and the second device simultaneously send the third message on the narrowband, so that a fifth device around the first device and a sixth device around the second device set, based on the third time-frequency resource information carried in the third message, current medium busy time values of the fifth device and the sixth device respectively after receiving the second message, where a medium is considered to be busy (busy) within the time, so that the devices around the first device and the second device do not preempt a communication channel between the first device and the second device, thereby maintaining stability of LR transmission performed by a narrowband device. In addition, the third device and the fourth device are capable of receiving a message on the broadband, and the fifth device and the sixth device are capable of receiving a message on the narrowband.

Optionally, that the first device and the second device send the third message on the second bandwidth is specifically: The first device and the second device send the third message on at least two different second bandwidths.

A specific operation may be: The first device and/or the second device may send the third message by using a duplication sending mechanism. The duplication sending mechanism is a message transmission mode in which a message of the second bandwidth is duplicated and transmitted on at least two second bandwidths. In other words, a message of a second channel width is duplicated and transmitted on at least two second channel widths. In other words, the third message is duplicated and sent on at least two second channel widths. A physical header portion and a MAC layer portion of the third message may be specifically duplicated.

For example, if the third message is a message sent on a 10 M bandwidth (a channel), sending the third message on at least two different second bandwidths may be sending a same third message on two 10 M bandwidths (channels) of 20 M. The third message is sent on one 10 M bandwidth (a channel), and the third message is sent on the other 10 M bandwidth (a channel).

For example, if the third message is a message sent on a 5 M bandwidth (a channel), sending the third message on at least two different second bandwidths may be sending a same third message on two 5 M bandwidths (channels) of 10 M, or sending a same third message on four 5 M bandwidths (channels) of 20 M.

The third message is sent on a first 5 M bandwidth (a channel), the third message is sent on a second 5 M bandwidth (a channel), the third message is sent on a third 5 M bandwidth (a channel), the third message is sent on a fourth 5 M bandwidth (a channel), and so on.

For example, it is assumed that when the first bandwidth is greater than or equal to 20 M, and the second bandwidth is less than 20 M, it can be learned that the first bandwidth is a broadband and the second bandwidth is a narrowband. In other words, the first device may send the third message on at least two different narrowbands. In this way, a narrowband device can detect a preamble of a narrowband, considers (through processing based on a detectable-preamble mechanism) that a channel is busy, and does not contend for the channel. In this case, a narrowband device within a ring area also considers that the channel is busy, and does not send a message.

Optionally, before the foregoing step S201, the foregoing method further includes the following step:

The first device sends a fourth message on the second bandwidth, where the fourth message carries a channel occupancy period, and an expiration point of the channel occupancy period is any time point after a time point at which the first device receives the second message.

The fourth message may be a CTS message, for example, a CTS message sent by using the second bandwidth or another message sent by using the second bandwidth.

Optionally, after the second device receives the first message sent by the first device, the foregoing method further includes the following step:

The second device sends a fifth message on the second bandwidth, where the fifth message carries a channel occupancy period, and an expiration point of the channel occupancy period is any time point after a time point at which the second device sends the third message.

The fifth message may be a CTS message, for example, a CTS message sent by using the second bandwidth or another message sent by using the second bandwidth.

Optionally, when the first bandwidth is greater than or equal to 20 M, the second bandwidth is less than 20 M, and that the first device sends the third message on the second bandwidth in the foregoing step S204 is specifically: When a distance between the first device and the second device is greater than or equal to a preset threshold, the first device sends the third message on the second bandwidth. The preset threshold may be 1 meter, 2 meters, 3 meters, 7 meters, 10 meters, or another value.

It should be noted that, that based on the third time-frequency resource information, the first device sends a message to the second device on the first bandwidth, or the first device receives, on the first bandwidth, a message sent by the second device means: Within medium reservation time information included in a third time-frequency resource, the first device sends the message to the second device on the first bandwidth, or the first device receives, on the first bandwidth, the message sent by the second device. For example, the medium reservation time information included in the third time-frequency resource is a period of time from a time point a to a time point b, and a message sending/receiving time between the first device and the second device is from the time point a to the time point b.

Figure 6:
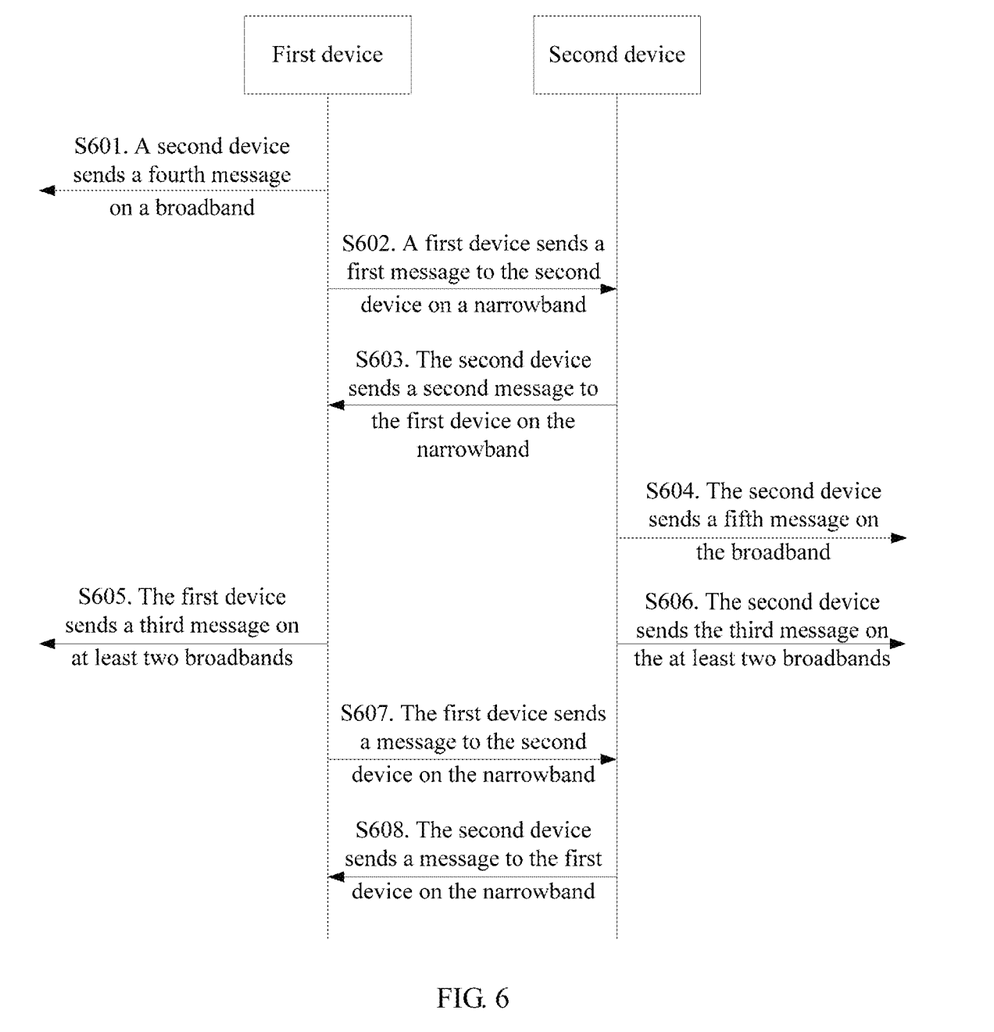
FIG. 6 is a schematic flowchart of a message sending method according to Embodiment 2 of the present invention.

For example, referring to FIG. 6, FIG. 6 is a schematic flowchart of a message sending method according to Embodiment 2 of the present invention. When a first bandwidth is less than 20 M (namely, a narrowband), a second bandwidth is greater than or equal to 20 M (namely, a broadband), and the method includes the following steps:

S601. A first device sends a fourth message on a broadband, where the fourth message carries a channel occupancy period, and an expiration point of the channel occupancy period is any time point after a time point at which the first device receives a second message.

S602. The first device sends a first message to a second device on a narrowband, where the first message carries first time-frequency resource information reserved by the first device.

S603. The second device receives the first message on the narrowband, and sends the second message on the narrowband in response to the first message, where the second message carries second time-frequency resource information reserved by the second device, and the second time-frequency resource information is determined based on the first time-frequency resource information.

S604. The second device sends a fifth message on the broadband, where the fifth message carries a channel occupancy period, and an expiration point of the channel occupancy period is any time point after a time point at which the second device sends a third message.

S605. The first device sends the third message on at least two different broadbands, where the third message carries third time-frequency resource information reserved by the first device, and the third time-frequency resource information is determined based on the first time-frequency resource information and/or the second time-frequency resource information.

S606. When the first device sends the third message, the second device sends the third message on the at least two different broadbands, where the third message carries the third time-frequency resource information reserved by the second device.

S607. Based on the third time-frequency resource information, the first device sends a message to the second device on the narrowband; and the second device receives, on the narrowband, the message sent by the first device.

S608. Based on the third time-frequency resource information, the second device receives, on the narrowband, a message sent by the first device; and the first device receives, on the narrowband, the message sent by the second device.

It should be noted that, for specific implementations of step S601 to step S608 in this embodiment of the present invention, refer to the foregoing message sending method, and details are not described herein again.

Figure 7:
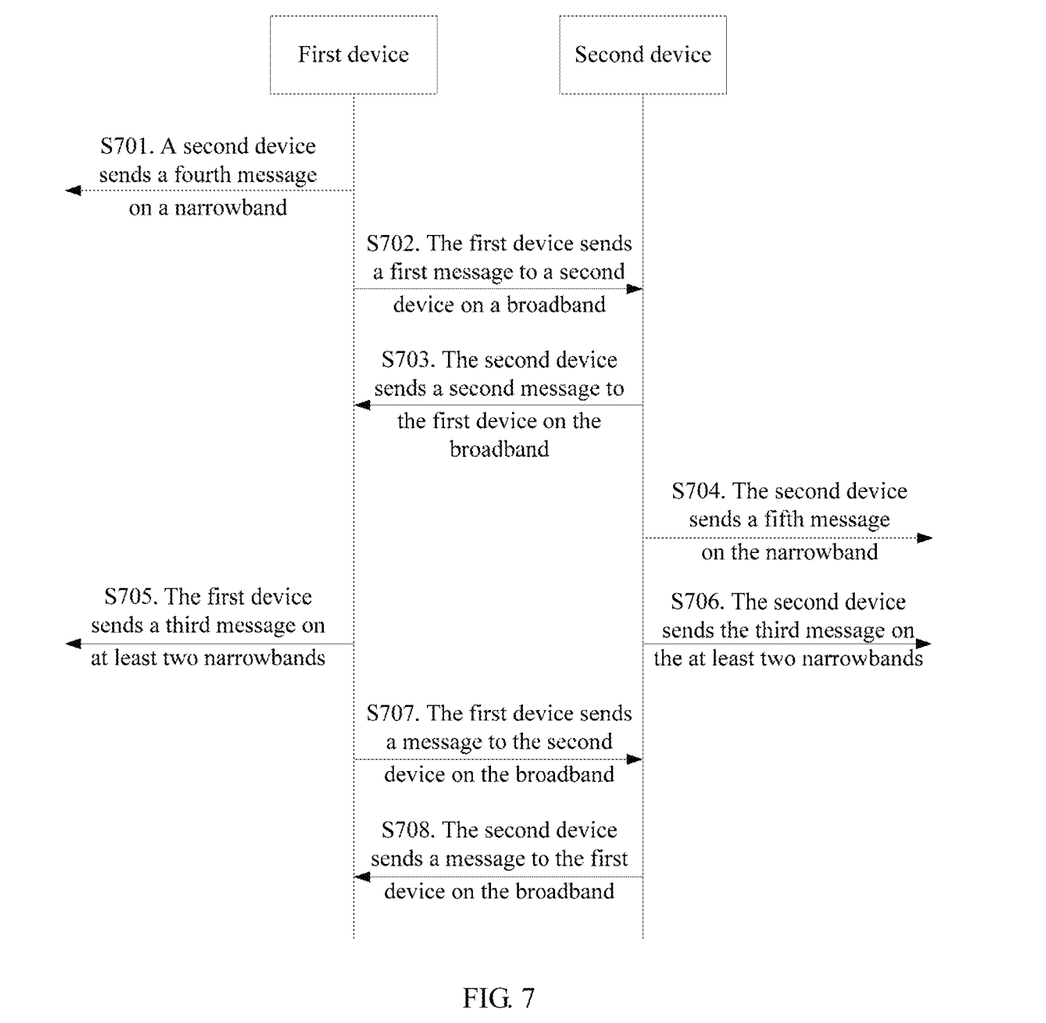
FIG. 7 is a schematic flowchart of a message sending method according to Embodiment 3 of the present invention.

For example, referring to FIG. 7, FIG. 7 is a schematic flowchart of a message sending method according to Embodiment 3 of the present invention. When a first bandwidth is greater than or equal to 20 M (namely, a broadband), a second bandwidth is less than 20 M (namely, a narrowband), and the method includes the following steps:

S701. A first device sends a fourth message on a narrowband, where the fourth message carries a channel occupancy period, and an expiration point of the channel occupancy period is any time point after a time point at which the first device receives a second message.

S702. The first device sends a first message to a second device on a broadband, where the first message carries first time-frequency resource information reserved by the first device.

S703. The second device receives the first message on the broadband, and sends the second message on the broadband in response to the first message, where the second message carries second time-frequency resource information reserved by the second device, and the second time-frequency resource information is determined based on the first time-frequency resource information.

S704. The second device sends a fifth message on the narrowband, where the fifth message carries a channel occupancy period, and an expiration point of the channel occupancy period is any time point after a time point at which the second device sends a third message.

S705. When a distance between the first device and the second device is greater than or equal to a preset threshold, the first device sends the third message on at least two different narrowbands, where the third message carries third time-frequency resource information reserved by the first device, and the third time-frequency resource information is determined based on the first time-frequency resource information and/or the second time-frequency resource information.

S706. When the first device sends the third message, the second device sends the third message on the at least two different narrowbands, where the third message carries the third time-frequency resource information reserved by the second device.

S707. Based on the third time-frequency resource information, the first device sends a message to the second device on the broadband; or the first device receives, on the broadband, a message sent by the second device.

S708. Based on the third time-frequency resource information, the second device receives, on the broadband, a message sent by the first device; or the second device sends a message to the first device on the broadband.

It should be noted that, for specific implementations of step S701 to step S708 in this embodiment of the present invention, refer to the foregoing message sending method, and details are not described herein again.

With reference to the accompany drawings, the following describes an apparatus, configured to implement the foregoing methods, according to the embodiments of the present invention.

Figure 8:
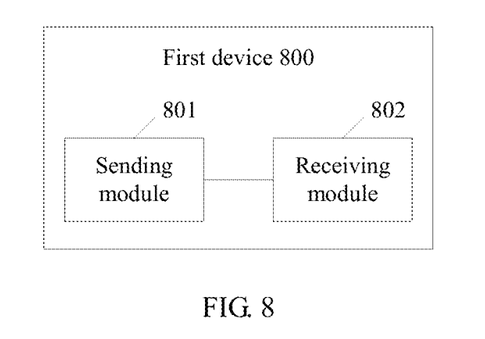
FIG. 8 is a schematic structural diagram of a first device according to an embodiment of the present invention.

Referring to FIG. 8, FIG. 8 is a schematic structural diagram of a first device according to an embodiment of the present invention.

As shown in FIG. 8, a first device 800 may include a sending module 801 and a receiving module 802.

The sending module 801 is configured to send a first message to a second device on a first bandwidth, where the first message carries first time-frequency resource information reserved by the first device.

The receiving module 802 is configured to receive, on the first bandwidth, a second message sent by the second device in response to the first message, where the second message carries second time-frequency resource information reserved by the second device, and the second time-frequency resource information is determined based on the first time-frequency resource information.

The sending module 801 is further configured to send a third message on a second bandwidth, where the third message carries third time-frequency resource information reserved by the first device, and the third time-frequency resource information is determined based on the first time-frequency resource information and/or the second time-frequency resource information.

The sending module 801 is further configured to send, for the first device, a message to the second device on the first bandwidth based on the third time-frequency resource information.

Alternatively, the receiving module 802 is further configured to receive, on the first bandwidth based on the third time-frequency resource information, a message sent by the second device, where when the first bandwidth is less than 20 M, the second bandwidth is greater than or equal to 20 M; or when the first bandwidth is greater than or equal to 20 M, the second bandwidth is less than 20 M.

Optionally, that the sending module 801 sends the third message on the second bandwidth is specifically: sending the third message on at least two different second bandwidths.

Optionally, the time-frequency resource information is carried in a duration field or a physical header.

Optionally, the sending module 801 is further configured to send a fourth message on the second bandwidth, where the fourth message carries a channel occupancy period, and an expiration point of the channel occupancy period is any time point after a time point at which the first device receives the second message.

Optionally, the time-frequency resource information includes medium reservation time information and/or reserved channel information.

Optionally, when the first bandwidth is greater than or equal to 20 M, the second bandwidth is less than 20 M, and that the sending module 801 sends the third message on the second bandwidth is specifically: when a distance between the first device and the second device is greater than or equal to a preset threshold, sending, for the first device, the third message on the second bandwidth.

It should be noted that the foregoing modules (the sending module 801 and the receiving module 802) are configured to perform related steps in the foregoing methods.

In this embodiment, the first device 800 is presented in a form of a module. The "module" herein may be an application-specific integrated circuit (application-specific integrated circuit, ASIC), a processor that executes one or more software or firmware programs and a memory, an integrated logic circuit, and/or another component that can provide the foregoing functions. In addition, the foregoing sending module 801 and receiving module 802 may be implemented by using a communications interface shown in FIG. 10.

Figure 9:
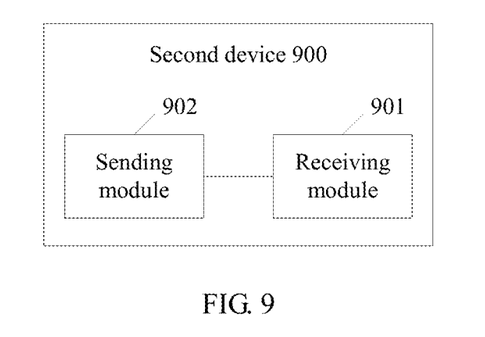
FIG. 9 is a schematic structural diagram of a second device according to an embodiment of the present invention.

As shown in FIG. 9, a second device 900 may include a receiving module 901 and a sending module 902.

The receiving module 901 is configured to receive, on a first bandwidth, a first message sent by a first device, where the first message carries first time-frequency resource information reserved by the first device.

The sending module 902 is configured to send a second message to the first device on the first bandwidth in response to the first message, where the second message carries second time-frequency resource information reserved by the second device, and the second time-frequency resource information is determined based on the first time-frequency resource information.

The sending module 902 is further configured to send a third message on a second bandwidth, where the third message carries third time-frequency resource information reserved by the second device, and the third time-frequency resource information is determined based on the first time-frequency resource information and/or the second time-frequency resource information.

The receiving module 901 is further configured to receive, for the second device on the first bandwidth based on the third time-frequency resource information, a message sent by the first device.

Alternatively, the sending module 902 is further configured to send a message to the first device on the first bandwidth based on the third time-frequency resource information. When the first bandwidth is less than 20 M, the second bandwidth is greater than or equal to 20 M; or when the first bandwidth is greater than or equal to 20 M, the second bandwidth is less than 20 M.

Optionally, that the sending module 902 sends the third message on the second bandwidth is specifically: sending the third message on at least two different second bandwidths.

Optionally, the time-frequency resource information is carried in a duration field or a physical header.

Optionally, the time-frequency resource information includes medium reservation time information and/or reserved channel information.

It should be noted that the foregoing modules (the sending module 902 and the receiving module 901) are configured to perform related steps in the foregoing methods.

In this embodiment, the second device 900 is presented in a form of a module. The "module" herein may be an application-specific integrated circuit (application-specific integrated circuit, ASIC), a processor that executes one or more software or firmware programs and a memory, an integrated logic circuit, and/or another component that can provide the foregoing functions. In addition, the foregoing sending module 902 and receiving module 901 may be implemented by using a communications interface shown in FIG. 10.

Figure 10:
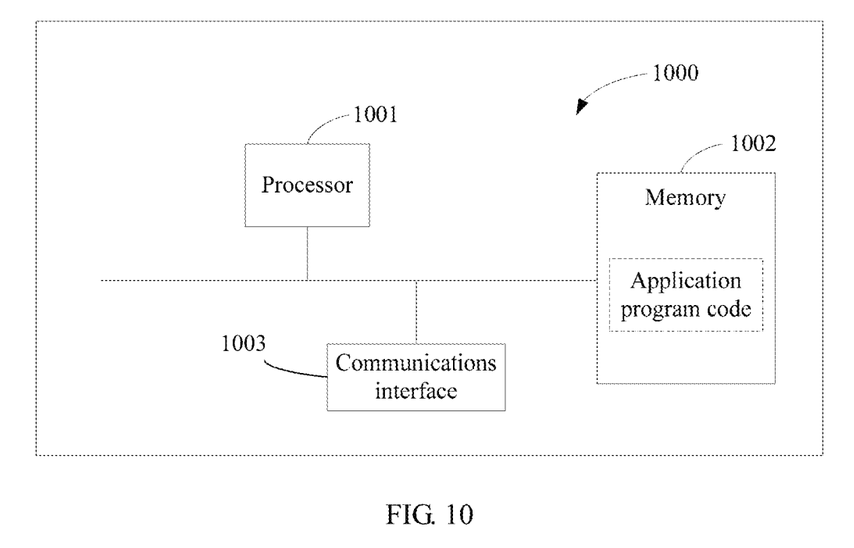
FIG. 10 is a schematic structural diagram of a device according to an embodiment of the present invention.

As shown in FIG. 10, the first device 800 and the second device 900 may be implemented in a structure in FIG. 10. A device 1000 includes at least one processor 1001, at least one memory 1002, and at least one communications interface 1003. In addition, the device may further include general components such as an antenna, and details are not described herein.

The processor 1001 may be a general-purpose central processing unit (CPU), a microprocessor, an application-specific integrated circuit (application-specific integrated circuit, ASIC), or one or more integrated circuits for controlling execution of the foregoing solution program.

The communications interface 1003 is configured to communicate with another device or a communications network, such as the Ethernet, a radio access network (RAN), or a wireless local area network (Wireless Local Area Networks, WLAN).

The memory 1002 may be a read-only memory (read-only memory, ROM) or another type of static storage device capable of storing static information and instructions, or a random access memory (random access memory, RAM) or another type of dynamic storage device capable of storing information and instructions, or may be an electrically erasable programmable read-only memory (Electrically Erasable Programmable Read-Only Memory, EEPROM), a compact disc read-only memory (Compact Disc Read-Only Memory, CD-ROM) or other optical disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in an instruction or data structure form and that can be accessed by a computer, but is not limited thereto. The memory may exist independently, and is connected to the processor by using the bus. Alternatively, the memory may be integrated with the processor.

The memory 1002 is configured to store application program code for executing the foregoing solution, and the processor 801 controls the execution. The processor 801 is configured to execute the application program code stored in the memory 1002.

When the device shown in FIG. 10 is the first device, the code stored in the memory 1002 may perform the foregoing message sending method performed by the first device, for example, sending a first message to the second device on a first bandwidth, where the first message carries first time-frequency resource information reserved by the first device; receiving, on the first bandwidth, a second message sent by the second device in response to the first message, where the second message carries second time-frequency resource information reserved by the second device, and the second time-frequency resource information is determined based on the first time-frequency resource information; sending a third message on a second bandwidth, where the third message carries third time-frequency resource information reserved by the first device, and the third time-frequency resource information is determined based on the first time-frequency resource information and/or the second time-frequency resource information; and based on the third time-frequency resource information, sending a message to the second device on the first bandwidth; or receiving, by the first device on the first bandwidth, a message sent by the second device, where when the first bandwidth is less than 20 M, the second bandwidth is greater than or equal to 20 M; or when the first bandwidth is greater than or equal to 20 M, the second bandwidth is less than 20 M.

When the device shown in FIG. 10 is the second device, the code stored in the memory 1002 may perform the foregoing message sending method performed by the second device, for example, receiving, on a first bandwidth, a first message sent by the first device, where the first message carries first time-frequency resource information reserved by the first device; sending a second message to the first device on the first bandwidth in response to the first message, where the second message carries second time-frequency resource information reserved by the second device, and the second time-frequency resource information is determined based on the first time-frequency resource information; sending a third message on a second bandwidth, where the third message carries third time-frequency resource information reserved by the second device, and the third time-frequency resource information is determined based on the first time-frequency resource information and/or the second time-frequency resource information; and based on the third time-frequency resource information, receiving, on the first bandwidth, a message sent by the first device; or sending, by the second device, a message to the first device on the first bandwidth, where when the first bandwidth is less than 20 M, the second bandwidth is greater than or equal to 20 M; or when the first bandwidth is greater than or equal to 20 M, the second bandwidth is less than 20 M.

An embodiment of the present invention further provides a computer storage medium. The computer storage medium may store a program, and when the program is executed, some or all of the steps of any message sending method described in the foregoing method embodiments are performed.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable memory. Based on such an understanding, the technical solutions of the present invention essentially, or the part contributing to the prior art, or all or a part of the technical solutions may be implemented in the form of a software product. The software product is stored in a memory and includes several instructions for instructing a computer device (which may be a personal computer, a server, or a network device) to perform all or a part of the steps of the methods described in the embodiments of the present invention. The foregoing memory includes: any medium that can store program code, such as a USB flash drive, a read-only memory (ROM, Read-Only Memory), a random access memory (RAM, Random Access Memory), a removable hard disk, a magnetic disk, or an optical disc.

A person of ordinary skill in the art may understand that all or some of the steps of the methods in the embodiments may be implemented by a program instructing relevant hardware. The program may be stored in a computer readable memory. The memory may include a flash memory, a read-only memory (English: Read-Only Memory, ROM for short), a random access memory (English: Random Access Memory, RAM for short), a magnetic disk, an optical disc, and the like.

The embodiments of the present invention are described in detail above. The principle and implementation of the present invention are described herein through specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limit to the present invention.

What is claimed is:

1. A message sending method, comprising:
   sending, by a first device, a first message to a second device on a first bandwidth, wherein the first message carries first time-frequency resource information reserved by the first device;
   receiving, by the first device on the first bandwidth, a second message sent by the second device in response to the first message, wherein the second message carries second time-frequency resource information reserved by the second device, and the second time-frequency resource information is determined based on the first time-frequency resource information;
   sending, by the first device, a third message on a second bandwidth, wherein the third message carries third time-frequency resource information reserved by the first device, and the third time-frequency resource information is determined based on the first time-frequency resource information, the second time-frequency resource information, or both; and
   based on the third time-frequency resource information, sending, by the first device, a message to the second device on the first bandwidth; or receiving, by the first device on the first bandwidth, a message sent by the second device, wherein if the first bandwidth is less than 20 M, the second bandwidth is greater than or equal to 20 M; or if the first bandwidth is greater than or equal to 20 M, the second bandwidth is less than 20 M.

2. The method according to claim 1, wherein the sending, by the first device, a third message on a second bandwidth comprises: sending, by the first device, the third message on at least two different second bandwidths.

3. The method according to claim 1, wherein the time-frequency resource information is carried in a duration field or a physical header.

4. The method according to claim 1, wherein before the sending, by a first device, a first message to a second device on a first bandwidth, the method further comprises:
   sending, by the first device, a fourth message on the second bandwidth, wherein the fourth message carries a channel occupancy period, and an expiration point of the channel occupancy period is any time point after a time point at which the first device receives the second message.

5. The method according to claim 1, wherein the time-frequency resource information comprises medium reservation time information, reserved channel information, or both.

6. The method according to claim 1, wherein if the first bandwidth is greater than or equal to 20 M, the second bandwidth is less than 20 M, and the sending, by the first device, a third message on a second bandwidth comprises: if a distance between the first device and the second device is greater than or equal to a preset threshold, sending, by the first device, the third message on the second bandwidth.

7. A message sending method, comprising:
   receiving, by a second device on a first bandwidth, a first message sent by a first device, wherein the first message carries first time-frequency resource information reserved by the first device;
   sending, by the second device, a second message to the first device on the first bandwidth in response to the first message, wherein the second message carries second time-frequency resource information reserved by the second device, and the second time-frequency resource information is determined based on the first time-frequency resource information;

sending, by the second device, a third message on a second bandwidth, wherein the third message carries third time-frequency resource information reserved by the second device, and the third time-frequency resource information is determined based on the first time-frequency resource information, the second time-frequency resource information, or both; and based on the third time-frequency resource information, receiving, by the second device on the first bandwidth, a message sent by the first device; or sending, by the second device, a message to the first device on the first bandwidth, wherein if the first bandwidth is less than 20 M, the second bandwidth is greater than or equal to 20 M; or if the first bandwidth is greater than or equal to 20 M, the second bandwidth is less than 20 M.

8. The method according to claim 7, wherein the sending, by the second device, a third message on a second bandwidth comprises: sending, by the second device, the third message on at least two different second bandwidths.

9. The method according to claim 7, wherein the time-frequency resource information is carried in a duration field or a physical header.

10. The method according to claim 7, wherein the time-frequency resource information comprises medium reservation time information, reserved channel information, or both.

11. A device, applied to a Wi-Fi system, wherein the Wi-Fi system comprises a first device and a second device, the device is the first device, and the first device comprises:

a transmitter configured to send a first message to the second device on a first bandwidth, wherein the first message carries first time-frequency resource information reserved by the first device; and a receiver configured to receive, on the first bandwidth, a second message sent by the second device in response to the first message, wherein the second message carries second time-frequency resource information reserved by the second device, and the second time-frequency resource information is determined based on the first time-frequency resource information, wherein the transmitter is further configured to send a third message on a second bandwidth, wherein the third message carries third time-frequency resource information reserved by the first device, and the third time-frequency resource information is determined based on the first time-frequency resource information, the second time-frequency resource information, or both; and the transmitter is further configured to send, for the first device, a message to the second device on the first bandwidth based on the third time-frequency resource information; or the receiver is further configured to receive, on the first bandwidth based on the third time-frequency resource information, a message sent by the second device, wherein if the first bandwidth is less than 20 M, the second bandwidth is greater than or equal to 20 M; or if the first bandwidth is greater than or equal to 20 M, the second bandwidth is less than 20 M.

12. The device according to claim 11, wherein that the transmitter sends the third message on the second bandwidth comprises that the transmitter sends the third message on at least two different second bandwidths.

13. The device according to claim 11, wherein the time-frequency resource information is carried in a duration field or a physical header.

14. The device according to claim 11, wherein the transmitter is further configured to send a fourth message on the second bandwidth, wherein the fourth message carries a channel occupancy period, and an expiration point of the channel occupancy period is any time point after a time point at which the first device receives the second message.

15. The device according to claim 11, wherein the time-frequency resource information comprises medium reservation time information, reserved channel information, or both.

16. The device according to claim 11, wherein if the first bandwidth is greater than or equal to 20 M, the second bandwidth is less than 20 M, and that the transmitter sends the third message on the second bandwidth comprises that if a distance between the first device and the second device is greater than or equal to a preset threshold, the transmitter sends for the first device, the third message on the second bandwidth.

17. A device, applied to a Wi-Fi system, wherein the Wi-Fi system comprises a first device and a second device, the device is the second device, and the second device comprises:

a receiver, configured to receive, on a first bandwidth, a first message sent by the first device, wherein the first message carries first time-frequency resource information reserved by the first device; and a transmitter configured to send a second message to the first device on the first bandwidth in response to the first message, wherein the second message carries second time-frequency resource information reserved by the second device, and the second time-frequency resource information is determined based on the first time-frequency resource information, wherein the transmitter is further configured to send a third message on a second bandwidth, wherein the third message carries third time-frequency resource information reserved by the second device, and the third time-frequency resource information is determined based on the first time-frequency resource information, the second time-frequency resource information, or both; and the receiver is further configured to receive, for the second device on the first bandwidth based on the third time-frequency resource information, a message sent by the first device; or the transmitter is further configured to send a message to the first device on the first bandwidth based on the third time-frequency resource information, wherein if the first bandwidth is less than 20 M, the second bandwidth is greater than or equal to 20 M; or if the first bandwidth is greater than or equal to 20 M, the second bandwidth is less than 20 M.

18. The device according to claim 17, wherein that the transmitter sends the third message on the second bandwidth comprises that the transmitter sends the third message on at least two different second bandwidths.

19. The device according to claim 17, wherein the time-frequency resource information is carried in a duration field or a physical header.

20. The device according to claim 17, wherein the time-frequency resource information comprises medium reservation time information, reserved channel information, or both.

* * * * *